(12) United States Patent
Roettger (10) Patent No.: US 9,849,492 B2
(45) Date of Patent: Dec. 26, 2017

(54) SKIVING TOOL

(71) Applicant: ECOROLL AG Werkzeugtechnik, Celle (DE)

(72) Inventor: Karsten Roettger, Celle (DE)

(73) Assignee: ECOROLL AG WERKZEUGTECHNIK, Celle (DE)

( * ) Notice: Subject to any disclaimer, the term of this patent is extended or adjusted under 35 U.S.C. 154(b) by 246 days.

(21) Appl. No.: 14/612,874

(22) Filed: Feb. 3, 2015

(65) Prior Publication Data

US 2015/0217353 A1  Aug. 6, 2015

(30) Foreign Application Priority Data

Feb. 5, 2014   (DE) .................. 10 2014 202 104

(51) Int. Cl.
| | | |
|---|---|---|
| *B23B 29/034* | (2006.01) | |
| *B23D 77/04* | (2006.01) | |
| *B21C 37/30* | (2006.01) | |
| *B24B 39/02* | (2006.01) | |
| *B23B 41/12* | (2006.01) | |

(52) U.S. Cl.
CPC ........ *B21C 37/30* (2013.01); *B23B 29/03489* (2013.01); *B23B 41/12* (2013.01); *B23D 77/04* (2013.01); *B24B 39/023* (2013.01); *B23B 29/0346* (2013.01); *B23B 29/03457* (2013.01); *B23B 29/03492* (2013.01); *B23B 2220/40* (2013.01); *B23B 2260/108* (2013.01); *B23B 2270/26* (2013.01); *Y10T 407/10* (2015.01); *Y10T 407/19* (2015.01); *Y10T 407/1952* (2015.01)

(58) Field of Classification Search
CPC ............. B23B 37/00; B23B 29/03432; B23B 29/03457; B23B 29/03489; B23B 29/0346; B23B 29/03492; B23B 41/12; B23B 2260/108; B23B 2270/26; B23D 77/04; B21C 37/30
See application file for complete search history.

(56) References Cited

U.S. PATENT DOCUMENTS 1,824,543 A * 9/1931 Hartwell ........... B23B 29/03407
                                                                  408/183
4,054,976 A * 10/1977 Ewald .................... B23B 51/08
                                                                  29/90.01
(Continued)

FOREIGN PATENT DOCUMENTS

DE         2644292 C2    6/1985
DE       19845948 A1    4/2000
(Continued)

*Primary Examiner* — Daniel Howell
*Assistant Examiner* — Ryan Rufo
(74) *Attorney, Agent, or Firm* — Whitham, Curtis & Cook, P.C.

(57) ABSTRACT

A combined skiver and a smooth rolling tool with a skiver head and behind this a smooth rolling head, wherein between the skiver head and the rolling head an exclusive torque transmitting coupling is located which restricts the allowable axis shaft offset and/or the angular position of the axes of the rolling head and skiver head, to which the rolling head is connected, characterized in that the skiver head (2) is guided through a workpiece bore via a hydrostatic guideway.

8 Claims, 4 Drawing Sheets

Schnitt A-A (56) References Cited

U.S. PATENT DOCUMENTS

| | | | | |
|---|---|---|---|---|
| 4,133,089 | A | * | 1/1979 | Heymanns .......... B23B 51/0486 29/90.01 |
| 4,184,794 | A | | 1/1980 | Henninghaus |
| 4,289,431 | A | * | 9/1981 | Berstein ............ B23B 29/03432 408/13 |
| 4,343,579 | A | * | 8/1982 | Shelton ................... F16B 15/08 206/345 |
| 4,574,442 | A | * | 3/1986 | Dickinson ............. B24B 39/023 29/90.01 |
| 5,393,177 | A | * | 2/1995 | Cook ............... B23B 29/03457 408/13 |
| 6,062,778 | A | * | 5/2000 | Szuba ..................... B23B 29/02 408/13 |
| 6,254,319 | B1 | * | 7/2001 | Maier .................. B23C 5/2444 407/45 |
| 6,367,137 | B1 | * | 4/2002 | Porter .................... B21C 37/30 29/90.01 |
| 9,308,586 | B2 | * | 4/2016 | Ostertag ................ B23B 41/12 |
| 2012/0149288 | A1 | * | 6/2012 | Miyauchi .......... B23B 29/03417 451/461 |

FOREIGN PATENT DOCUMENTS

| | | |
|---|---|---|
| DE | 102009040592 A1 | 3/2011 |
| EP | 1153683 A1 | 11/2001 |
| EP | 1169154 A1 | 1/2002 |
| EP | 1296801 A1 | 4/2003 |
| EP | 15122492 A1 | 3/2005 |

* cited by examiner

Schnitt A-A

SKIVING TOOL

FIELD OF THE INVENTION

The invention relates to a skiving tool with (a) a tool head, (b) at least one skiving knife and (c) at least one counterforce generation element, by means of which a counterforce to a passive force acting on the skiving tool can be generated during operation of the skiving tool.

BACKGROUND

Skiving tools of this sort are used particularly during the production of hydraulic cylinders for skiving the inner sides of pipes. Hydraulic cylinders must meet high requirements regarding the deviation of their shape: on the one hand, a high dimensional stability must be achieved, in particular a high dimensional stability and a low circularity irregularity. Additionally, the tool should follow errors in straightness of the pipe preform as they occur, especially on drawn precision steel pipes. These errors in straightness have a value of 1 to 2 millimeters per meter of pipe length. Furthermore, high requirements are set regarding the surface quality.

In order to meet these requirements with completed hydraulic cylinders, cold-drawn pipes are generally used as blanks. However, cold-drawn pipes are complex to produce. Therefore, an attempt is made to replace these with hot-rolled pipes. However, hot-rolled pipes do not achieve the same accuracy in shape.

A thread-cutting device is known from DE 198 45 948 A1 which may comprise a skiving tool that is arranged on a skiving head such that it can be moved radially. The disadvantage of this type of tool is that hot-rolled pipes are not easily processed, or cannot be processed at all.

Combined skiving and roller burnishing tools are known from DE 26 44 292 C2 and EP 1 512 492 B1 upon which oscillating knives are mounted onto a skiving knife, which can be moved axially relative to the tool head. The disadvantage of this type of system is the often low stiffness in the radial direction.

A skiving tool according to the preamble is known from DE 10 2009 040 592 A1 which comprises a roughing tool and a skiving tool, which are separated from one another by a coupling that allows for a radial misalignment. The disadvantage of this type of tool is that hot-rolled pipes cannot be easily processed.

SUMMARY

The invention aims to achieve a high dimensional stability and a consistent surface quality of the part in process, even if the pipe preform has a low dimensional accuracy and significant curvature.

The invention solves the problem by means of a skiving tool according to the preamble that comprises a knife holder to which the at least one skiving knife and the at least one counterforce generation element are fixed, and which is mounted on the tool head such that it can be moved in the radial direction relative to the tool head.

In addition, the invention is advantageous because, in order to achieve a higher quality of structural component, this advantage does not require a considerably complex construction to be achieved.

Within the scope of the present description, the term tool head should be understood in particular to mean the structural component or the section of the skiving tool that is guided onto the inner surface of the part when the skiving tool is in use. The tool head preferably cannot be bent. In particular, the tool head is the structural component or the section which is arranged in front of the skiving knife in the torque flow; in other words, the tool head directly or indirectly transmits a torque to the skiving knife.

The knife holder is preferably mounted on the tool head such that it is tilt-resistant. In other words, the knife holder is fixed such that it cannot execute any significant tilting movements relative to the tool head, but rather only a movement in the radial direction.

The term skiving knife should especially be understood to mean the structural component of the skiving tool that cuts off the chip when the skiving knife is in operation. The cutting edge is arranged on the skiving knife: this refers to the section of the skiving knife that comes into contact with the part during processing and cuts off the chip.

It is possible, and a preferred embodiment shows, that the skiving knife is designed as cutting edge attachment that can be firmly connected to the knife holder. In this case, the skiving knife in particular has a positive material connection, a friction connection or a form-fitting connection with the knife holder. Alternatively it is possible, and a preferred embodiment shows, that the skiving knife is an integral component of the knife holder. The cutting edge attachment is preferably made of coated or non-coated carbide, cermet or cutting ceramic.

The feature that at least one skiving knife is fixed on the knife holder should be understood in particular to mean that the skiving knife is fixed on the knife holder such that a relative movement between the cutting edge of the skiving knife and the knife holder is prevented. However, it is possible, and according to a preferred embodiment intended, that the skiving tool comprises at least two skiving knives and that one of the skiving knives is fixed on the knife holder such that its position relative to the other skiving knife or knives can be amended. It is only crucial that the skiving knives can be put in a position in which they are all fixed relative to the knife holder such that a diameter of a circumscribed circle remains constant, even during the influence of temporally varying passive forces acting on the skiving knives.

The fact that the at least one skiving knife and the at least one counterforce generation element are fixed to the knife holder means that when a cutting edge of the skiving knife moves radially inwards about an offset vector, i.e. along the longitudinal axis of the skiving tool, the counterforce element also moves about the same offset vector. If two, three or more skiving knives are available—as is the case according to a preferred embodiment—, all skiving knives that are fixed on the knife holder move about the same offset vector.

The at least one skiving knife and/or the at least one counterforce generation element are preferably fixed to the knife holder by means of a form-fitting, frictional or positive material connection.

The diameter of a circumscribed circle is the diameter of the circle upon which the points of the skiving knife that generate the contour are located. The diameter of the circumscribed circle closely corresponds to the inner diameter of the cylinder that is created by the skiving tool. Any possible discrepancies between the inner diameter of the finished cylinder and the diameter of the circumscribed circle may occur due to the spring-back of the material directly behind the cutting edge of the skiving knife.

The counterforce generation element should be understood to mean an element of the knife holder by means of which a counterforce is generated during operation of the skiving tool, which counteracts the passive force acting on the skiving tool.

The feature that the knife holder is mounted such that it can be moved in the radial direction relative to the tool head should be understood to mean that the knife holder can conduct a predetermined deviation from a central position and a further deviation is prevented. It is possible for the knife holder to be fixed relative to the tool head by means of at least one spring element. This has the advantage that, upon insertion of the skiving tool into the opening of the pipe preform, damage of an entry point in the pipe preform by a non-centrically rotating knife holder can be avoided. Alternatively, the knife holder is mounted on the tool head with bearing slackness. This means that no increasing force with increasing deviation from the central position acts on the knife holder.

The knife holder is preferably guided in the axial direction relative to the tool head. In particular, the knife holder is guided in the axial direction relative to the tool head. For example, the knife holder is mounted on a knife head and the knife head comprises a bearing guide or roller guide that prevents a movement of the knife holder in the axial direction relative to the knife head, but enables a movement in the radial direction.

According to a preferred embodiment, the counterforce generation element comprises guide elements, especially guide rails, that are in contact with the inner wall of the cylinder during operation of the skiving tool, such that the tool head is guided on to the inner wall of the cylinder. In this case, it may also be said that the knife holder is mounted such that it can move in the radial direction relative to the guide elements.

The skiving tool preferably comprises at least three skiving knives, especially exactly three skiving knives or exactly six skiving knives. The advantage of this type of skiving tool is that a high surface quality can be achieved, even with blanks that are not dimensionally stable. For example, if the blank has a straightness error, the chip thickness is adjusted for each of the skiving knives. As a result, various passive forces act on the skiving knives. The resulting total force on the knife holder pushes the skiving knife into a new position in which the chip thicknesses and thereby the passive forces are similar to one another. It is also possible that the skiving tool has two or more knife holders. These knife holders are preferably arranged behind one another along a longitudinal axis of the skiving tool.

With skiving tools according to the prior art, a frictional force must first of all be overcome before the skiving knives are able to reach their new position. Due to the transfer from sticking to sliding, this results in an abrupt change in the position of the skiving knives, which is damaging to the surface quality.

However, the skiving knives on this type of skiving tool are fixed to the knife holder and mounted such that they can move in a radial direction relative to the tool base. It is thus easier for the skiving knives to change their position in the event of a circularity irregularity. Jerky changes in position are avoided, thereby enabling an increase in surface quality. The above described mechanism also applies to the procedure in the event of circularity irregularities.

An advantage of the invention is that a high surface quality of the finished pipe inner surfaces can also be achieved when pipe preforms with higher straightness errors—for example, more than 2.5 millimeters per meter of pipe length—are being used.

It is especially favourable if the skiving tool comprises a torque transmitting device, the torque transmitting device connecting the tool head and the knife holder such that they are torque-resistant in at least one rotation direction. The torque transmitting device may, for example, comprise or be made of an Oldham coupling. Alternatively or additionally, the torque transmission device may comprise a claw coupling.

According to a preferred embodiment, the counterforce generation element comprises a second skiving knife. In this case, it is possible, and a preferred embodiment shows, that the first skiving knife and the at least second skiving knife are securely fixed to one another, for examples by a positive material connection. In particular, the first skiving knife and the at least second skiving knife are joined together as a single piece, i.e. free of joints. Pipe preforms with a small diameter can be processed in this way.

According to a preferred embodiment, the skiving tool comprises at least a third skiving knife. In this case it is possible, and a preferred embodiment shows, that the second skiving knife and the at least third skiving knife are securely connected to one another, for example by a positive material connection. In particular, the second skiving knife and the at least third skiving knife are joined together as a single piece, i.e. free of joints. In addition to this, it is possible, and a preferred embodiment shows, that all three skiving knives are arranged on the knife holder and are preferably connected by a positive material connection or joined as a single piece.

If the second skiving knife and the at least third skiving knife are securely connected to one another, it is favourable if the first skiving knife is fixed on the knife holder so that its radial position is infinitely variable, for example by means of a screw drive and/or actuator, especially a piezo actuator. In this case, the diameter of the circumscribed circle is infinitely variable.

Alternatively or additionally, the skiving knife comprises at least one adjustment device, in particular a motor, by means of which a diameter of a circumscribed circle, on which the cutting edges of the skiving knives are located, can be infinitely adjusted. The adjustment device is preferably fixed to the knife holder, thereby achieving an especially high adjustment accuracy. For example, the motor comprises a screw drive, so that the diameter of the circumscribed circle can be manually adjusted.

It is particularly favourable if the number of skiving knives is an integral multiple of three. Three skiving knives are especially favourable. In this case, it is sufficient, and according to a preferred embodiment intended, that only one of the skiving knives is arranged such that it can move relative to the knife holder. In this case, the diameter of the circumscribed circle can be easily adjusted by changing the position of only one of the skiving knives relative to the knife holder and thus relative to the two other skiving knives.

The adjustment device is preferably designed to electronically alter the diameter of the circumscribed circle. In other words, the adjustment device comprises an actuator that is arranged such that the diameter of the circumscribed circle can be altered by activating the actuator. It is then possible to process the inner surface of the part, as the tool is inserted into the part. At the end of processing, the diameter of the circumscribed circle can be reduced by activating the actuator and the skiving knife can be removed without any possibility of protruding skiving knives damaging the finished inner surface.

It is especially favourable if the skiving knives are arranged in equidistant angle cuts, which results in particularly high surface qualities. If precisely one of the skiving knives is arranged such that it can move relative to the knife holder, it is sufficient for two further skiving knives to be symmetrically arranged on a level in which the movement of the skiving knife occurs and which is perpendicular to the level at which the skiving knives rotate, i.e. the level parallel to the longitudinal axis of the skiving tool.

According to a preferred embodiment, the adjustment device is designed such that at least the first skiving knife can be moved in the radial direction relative to the knife holder. However, it is possible for the adjustment device to be designed for manual adjustment and/or electronic adjustment. It should be noted that the numbering of the skiving knives is arbitrary. In other words, it is insignificant which of the skiving knives is perceived as the first skiving knife.

Alternatively or additionally to this, the adjustment device is designed such that the knife holder can be elastically deformed by the actuator in such a way that the diameter of the circumscribed circle changes. In particular, it is possible for the adjustment device to have two or more actuators, one of which moves one of the skiving knives in the radial direction and the other actuator deforms the knife holder as a whole, thereby changing the diameter of the circumscribed circle.

It is especially favourable if the adjustment device comprises at least one piezo motor. It is possible, and according to a preferred embodiment intended, that the piezo motor comprises a stack of piezo elements. It is particularly favourable if the actuator has a lifting of 500 μm. Piezo actuators have the advantage of a higher stiffness, meaning that they can absorb the passive force acting on the skiving knife. In addition, it is possible to measure the deviation of the piezo actuator by calculating its electrical capacity.

The skiving tool preferably comprises an activation device by means of which all skiving knives can be collectively moved radially inwards. This activation device may comprise, for example, a binary motor, especially a hydraulic motor. In other words, the activation device can be put in an active state in which the skiving knives are in a radially outer position, meaning that the inner wall of the pipe can be skived, and in a deactivated state, in which the skiving knives are radially retracted, so that the tool can be withdrawn from the skived pipe without the skiving knives damaging the inner surface.

According to a preferred embodiment, the skiving tool comprises a diameter determination device for determining the diameter of the circumscribed circle and/or the inner diameter of the finished pipe. For example, the diameter determination device comprises a tactile body that is preloaded on to the inner side of the pipe, meaning that the inner diameter of the pipe can be determined from the deviation of the tactile body.

If the skiving tool comprises a roller burnishing tool—as is intended in a preferred embodiment —, the measuring location at which the diameter determination device determines the inner diameter, is preferably located behind the roller burnishing tool in a feed direction.

For example, the diameter determination device comprises a device that is designed to measure the electrical capacity of the piezo actuator, if a piezo actuator makes up part of the adjustment device. The deviation is determined from the electrical capacity of the piezo actuator, and from this, the diameter of the circumscribed circle is determined. This may be done, for example, by calculating the dependence of the deviation from the electrical capacity in preliminary tests and placing it in on a graph. The deviation can then be determined from the measured electrical capacity by interpolation of the graph.

Alternatively or additionally, the diameter determination device comprises a gauge, for example a glass gauge, which is arranged relative to the first skiving knife such that the position of the skiving knife relative to the gauge can be read or automatically read. The adjustment device thus preferably comprises a screw, the turning of which can change the radial position of the first skiving knife. The skiving knife or a skiving knife accommodation moves past the gauge during a change in the radial position of the skiving knife, meaning that the change in position can be read. In particular, the gauge comprises a scale, the skiving knife or its holder comprising a marker, especially a second scale, which enables the position of the skiving knife relative to the gauge to be determined using the two scales. For example, the two scales are arranged in the same way as with a vernier calliper.

If the adjustment device is designed to deform the knife holder, the knife holder preferably has a notch or another material weakness that opens during deformation. The diameter determination device is then designed to measure the size of the recession, so as to determine the diameter of the circumscribed circle.

According to a preferred embodiment, the skiving tool has a position control that is connected to the adjustment device and the diameter determination device, and is designed to automatically adjust the diameter of the circumscribed circle to a nominal diameter that can be predefined. This means that wear and tear of the skiving knives does not lead to a reduction in the dimensional stability of the finished cylinder.

According to a preferred embodiment, the skiving tool comprises at least one spring, by means of which the knife holder is preloaded to a central position. The term central position should be understood to mean a position in which the mid-point of the circumcircle lies on the longitudinal axis of the skiving tool, or at least closer to the longitudinal axis than it would without the spring.

The skiving tool preferably comprises a boring head that is arranged in front of the skiving knives in the machining direction. It is favourable if the boring head is securely connected to the tool head, particularly in a way such that it can be detached: this enables the processing of pipes with large errors in cylindrical form and straightness.

DESCRIPTION OF THE DRAWINGS

In the following, the invention will be explained in more detail with the aid of drawings. They show FIG. 1 in the right partial image, a longitudinal cut through a skiving tool according to the invention, and in the left partial image, a cross-section along the line A-A, FIG. 2 a torque transmitting device in the form of an Oldham coupling that is part of the skiving tool according to FIG. 1, FIG. 3 a schematic image of the function of a position control of the skiving tool according to FIG. 1, FIG. 4 a second embodiment of a skiving tool according to the invention, FIG. 5 a third embodiment of a skiving tool according to the invention and FIG. 6 a fourth embodiment of a skiving tool according to the invention.

DETAILED DESCRIPTION

Figure 1:
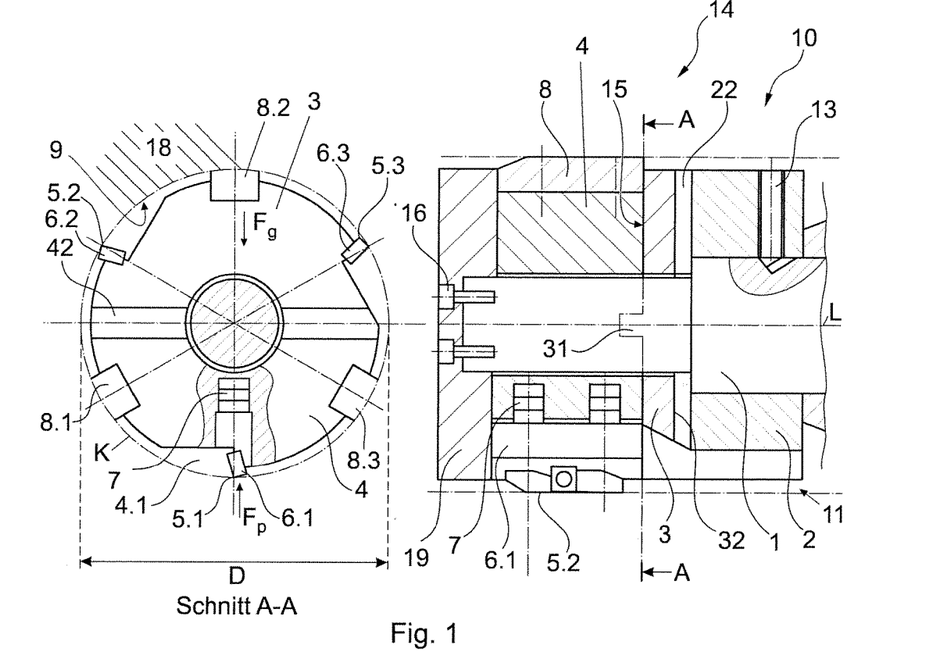

In the right partial image of FIG. 1 a cross-section through a skiving tool 10 according to invention is depicted in the form of a combined skiving-roller burnishing tool that comprises a tool head 1, which may also be described as a tool body. In the left partial image, which depicts a cut along the line A-A, it is clear that the skiving tool 10 comprises a skiving knife 6.1. During operation of the skiving tool 10, a passive force $F_p$ acts on the skiving knife 6.1. The skiving tool 10 also has a second skiving knife 6.2 and a third skiving knife 6.3. Each skiving knife 6 (reference number without a numerical suffix refers to all objects of the same type) has a cutting edge 5. In other words, the skiving knife 6.1 has a cutting edge 5.1, the skiving knife 6.2 a cutting edge 5.2, and the skiving knife 6.3 a cutting edge 5.3.

The skiving tool 10 comprises a first counterforce generation element in the form of a guide rail 8.2 that generates a counterforce $F_g$ to the passive force $F_p$ during operation. In addition to this, the skiving knives 6.2 and 6.3 function as counterforce generation elements which also contribute to the generation of the passive force $F_p$.

The skiving tool 10 comprises a torque transmitting device 11, which comprises an Oldham coupling 3 and a coupling hub 2 in the present case. The coupling hub 2 is connected to the tool head 1 by a screw 13. The skiving tool 10 has a knife holder 4 that is preferably disc-shaped and therefore can be referred to as a skiving disc. The torque transmitting device 11 is coupled with the knife holder 4 such that it is torque resistant. The skiving knives 6.1, 6.2, 6.3 are mounted on the knife holder.

The tool head 1 has a radial guide 14 that comprises a first guide surface 15, which is situated on a guide collar, and a guide flange 19. The guide flange 19 is fixed by means of at least one screw 16. The radial guide 14 ensures that the knife holder 4 can only move in the radial direction, i.e. perpendicular to a longitudinal axis L.

The skiving tool 10 comprises an adjustment device 7 which has a stack of piezo elements in the present case. In the embodiment depicted in FIG. 1, the adjustment device 7 is arranged such that it can move the cutting edge 5.1 of the knife 6.1 radially outwards and inwards. If the adjustment device 7 is activated such that the cutting edge 5.1 is moved radially inwards, the diameter of the circumscribed circle D decreases. The diameter of the circumscribed circle D is the diameter of the circumscribed circle K, i.e. the clearly defined circle on which the edges of all the cutting edges 5 of the skiving knives 6 are situated.

The left partial image in FIG. 1 shows that the knife holder 4 comprises three guide elements 8 in the form of a first guide rail 8.1, a second guide rail 8.2 and a third guide rail 8.3. When the skiving tool 10 is in use, these guide rails 8 are in contact with an inner wall 9 of a part 18 to be processed. The second first guide element 8.2 is part of the counterforce generation element.

Figure 2:
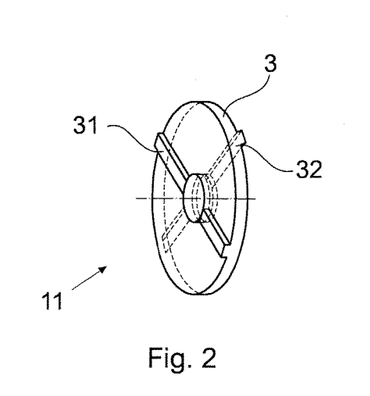

FIG. 2 shows a perspective view of the Oldham coupling 3. It should be recognised that the Oldham coupling 3 comprises a first rail-like elevation 31 that faces towards the knife holder 4. Offset at an angle of between 70° and 110°—for example a right angle—to this, the Oldham coupling 3 has a second elevation 32 that faces away from the knife holder. The first elevation 31 interlocks with a groove 42 in the knife holder 4. The second elevation 32 interacts with a second groove 22 that is arranged on the coupling hub 2. This creates a torque-resistant connection between the tool head 1 and the knife holder 4.

Figure 3:
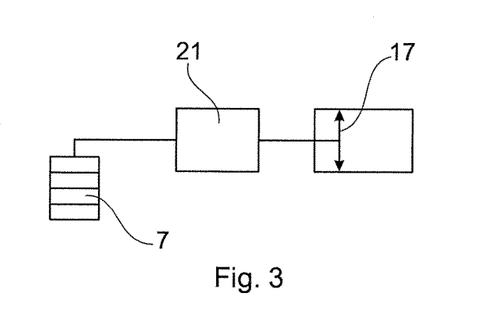

FIG. 3 schematically depicts a position control 21. The position control 21 refers to a device that is designed to adjust a deviation of the adjustment device 7 to a predefined nominal deviation, which corresponds to a predefined nominal diameter $D_{Soll}$ for the diameter of the circumscribed circle. It should be recognised that the position control 21 is electrically connected to the adjustment device 7 on one side and a diameter determination device 17 on the other.

In the present case, the diameter determination device 17 is made up of an electronic circuit, which creates an alternating current on the piezo elements of the adjustment device 7, reads and measures the phase shift between voltage and current. From this, it calculates the capacity of the piezo elements and in turn the deviation of the adjustment device 7. The position control 21 registers this deviation and compares it with the nominal deviation and/or calculates the diameter of the circumscribed circle from the deviation and compares this with the nominal diameter $D_{Soll}$. Should the calculated actual value D deviate from the predefined nominal value $D_{Soll}$, the position control 21 controls the adjustment device 7 such that the value $|D-D_{Soll}|$ of the difference reduces, ideally to zero. The electrical energy is transmitted to the electronic circuit, for example, via cable or slide contacts, or wirelessly via induction.

Figure 4:
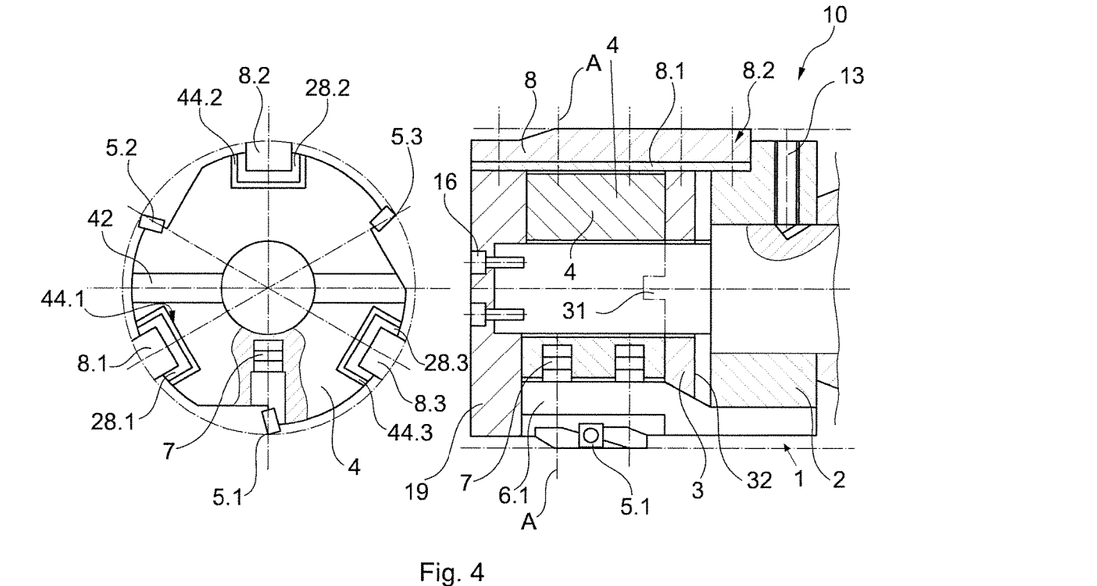

FIG. 4 shows a second embodiment of a skiving tool 10 according to the invention where the guide elements 8.1, 8.2, 8.3 are mounted on the coupling hub 2 and the guide flange 19. In addition to this, the guide elements 8 are each screwed on with a guide rail support 28.1, 28.2 and 28.3 and a screw. The guide elements 8 are thereby securely connected to the tool head 1. The grooves 44.1, 44.2, 44.3 enable a movement of the knife holder 4 relative to the guide elements 8.

Figure 5:
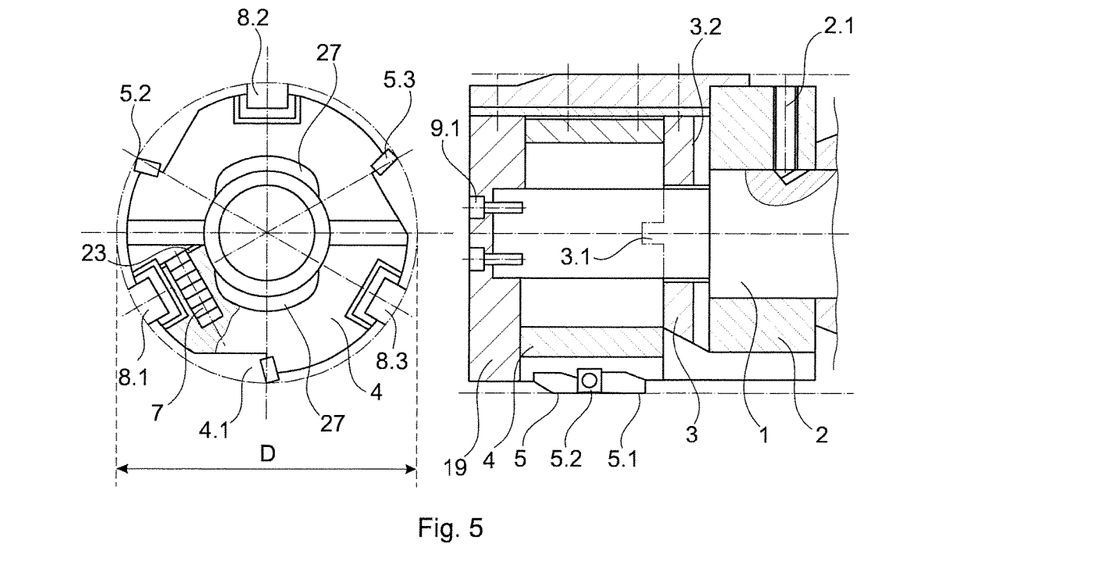

FIG. 5 depicts a third embodiment of a skiving tool 10 according to the invention whose knife holder 4 comprises a slit 23 which carries the knife holder 4 across its full radial extension. The knife holder 4 comprises recesses 27 that are arranged such that a flexibility in the knife holder 4 along one of the deformations created by the adjustment device 7 is greater than along a deformation in another direction. The adjustment device 7, which comprises a piezo actuator in the present case, is arranged such that it is able to increase and reduce the slit 23 by creating an elastic deformation by spreading the knife holder 4. The larger the slit 23, the greater the diameter of the circumscribed circle D.

Figure 6:
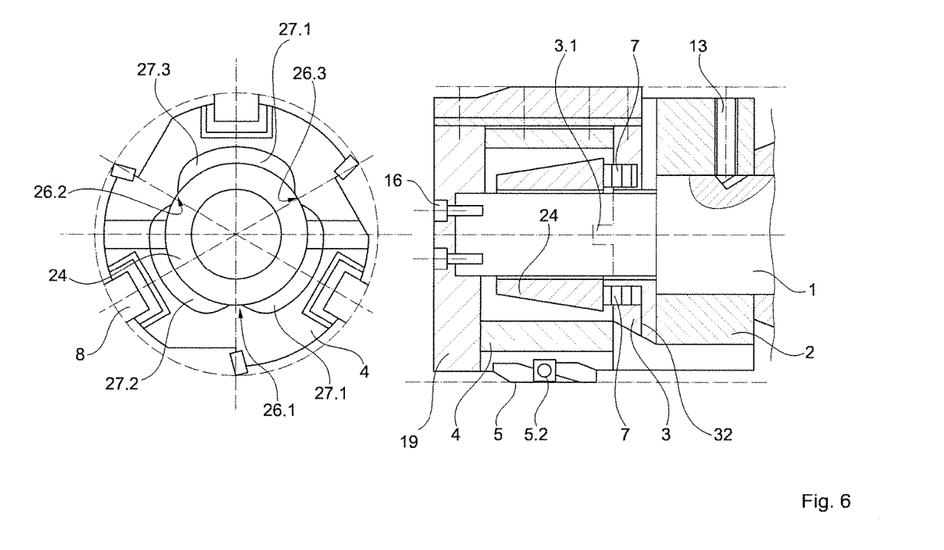

FIG. 6 depicts a further embodiment of the skiving tool 10 according to the invention where the adjustment device 7 acts on a cone 24 in the axial direction. If the adjustment device 7 is activated, it pushes the cone 24 against contact surfaces 26.1, 26.2, 26.3. The contact surfaces 26 are each arranged between two recesses 27.1, 27.2, 27.3 in the knife holder 4. Should the cone 24 move axially, the pressure on the contact surfaces 26 increases, causing the knife holder 4 to become deformed. The contact surfaces 26 are each arranged at the same angles as the skiving knives 6, so that the skiving knives 6 are pushed radially outwards by this deformation. By activating the adjustment device 7, the diameter of the circumscribed circle D is increased.

Figure 7:
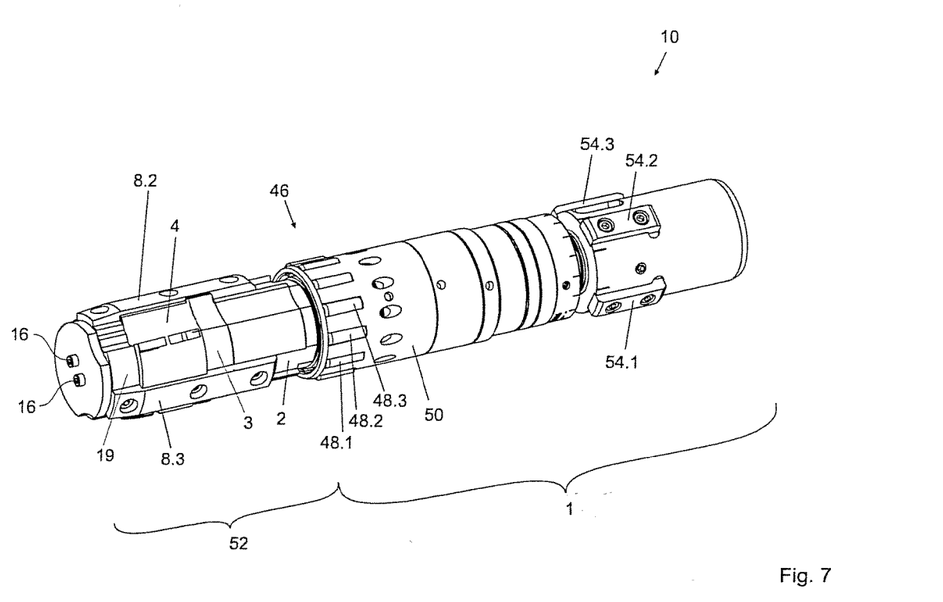
FIG. 7 depicts a three dimensional view of a skiving-roller burnishing tool according to the invention.

FIG. 7 shows a perspective, to-scale view of a skiving tool 10 according to a further embodiment. The skiving tool 10 comprises a roller burnishing tool 46 that is rigidly connected to the tool head 1. The roller burnishing tool 46 has a plurality of rolling elements 48.1, 48.2, . . . , which are guided into a cage 50 with radial slackness. The cage 50 is mounted on the tool head 1 such that it can be rotated in the circumferential direction.

The knife holder 4 is mounted on a knife head 52 such that it can be radially moved. The knife head 52 comprises the guide elements 8 and is rigidly connected to the tool head 1. It should be recognised that the tool head 1 has guide parts 54, by means of which it lies closely on a finished inner side of the pipe. The tool head 1 is thus guided in a self-centering manner.

| Reference list | |
|---|---|
| 1 | Tool head |
| 2 | Coupling hub |
| 3 | Oldham coupling |
| 4 | Knife holder |
| 5 | Cutting edge |
| 6 | Skiving knife |
| 7 | Adjustment device, motor |
| 8 | Guide element |
| 9 | Inner wall |
| 10 | Skiving tool |
| 11 | Torque transmitting device |
| 13 | Screw |
| 14 | Radial guide |
| 15 | Guide surface |
| 16 | Screw |
| 17 | Diameter determination device |
| 19 | Guide flange |
| 21 | Position control |
| 22 | Groove |
| 23 | Slit |
| 24 | Cone |
| 26 | Contact surface |
| 27 | Recess |
| 28 | Guide rail support |
| 31 | Elevation |
| 32 | Elevation |
| 42 | Groove |
| 44 | Groove |
| 46 | Roller burnishing tool |
| 48 | Rolling element |
| 50 | Cage |
| 52 | Knife head |
| 54 | Guide part |
| L | Longitudinal axis |
| D | Diameter of the circumscribed circle |
| K | Circumscribed circle |
| $F_p$ | Passive force |
| $F_g$ | Counterforce |

The invention claimed is:

1. A skiving tool, comprising:
   a tool head;
   at least one skiving knife;
   at least one counterforce generation element, by means of which a counterforce ($F_g$) to a passive force ($F_p$) acting on the at least one skiving knife can be generated;
   a knife holder onto which the at least one skiving knife and the at least one counterforce generation element are fixed; and
   at least one adjustment device by means of which a diameter of a circumscribed circle (D), on which a cutting edge of the at least one skiving knife is located, is infinitely variable,
     wherein the at least one adjustment device is configured with a motor such that the knife holder can be elastically deformed by the motor in such a way that the diameter of a circumscribed circle (D) changes, and
   wherein the knife holder is mounted to the tool head such that it can be moved in the radial direction relative to the tool head.

2. The skiving tool of claim 1 wherein the at least one adjustment device includes a motor.

3. The skiving tool of claim 2 wherein the motor is or includes a piezoelectric actuator.

4. A skiving tool, comprising:
   a tool head;
   at least one skiving knife;
   at least one counterforce generation element, by means of which a counterforce ($F_g$) to a passive force ($F_p$) acting on the at least one skiving knife can be generated;
   a knife holder onto which the at least one skiving knife and the at least one counterforce generation element are fixed;
   at least one adjustment device by means of which a diameter of a circumscribed circle (D), on which a cutting edge of the at least one skiving knife is located, is infinitely variable, wherein the adjustment device comprises a motor for electronically changing a diameter of a circumscribed circle (D); and
   a position control that is connected to the adjustment device and a diameter determination device, wherein the position control is configured to automatically adjust a diameter of the circumscribed circle (D) to a nominal diameter that can be predefined, and
   wherein the knife holder is mounted to the tool head such that it can be moved in the radial direction relative to the tool head.

5. The skiving tool of claim 4 wherein the at least one adjustment device includes a motor.

6. The skiving tool of claim 5 wherein the motor is or includes a piezoelectric actuator.

7. A skiving tool, comprising:
   a tool head;
   at least a first skiving knife, a second skiving knife, and a third skiving knife;
   at least one counterforce generation element, by means of which a counterforce ($F_g$) to a passive force ($F_p$) acting on the first skiving knife can be generated;
   a knife holder onto which the first skiving knife and the at least one counterforce generation element are fixed;
   a torque transmitting device connecting the tool head and the knife holder; and
   at least one adjustment device by means of which a diameter of a circumscribed circle (D), on which cutting edges of the first skiving knife, the second skiving knife, and the third skiving knife are located, is infinitely variable;
   wherein the knife holder is mounted to the tool head such that it can be moved in the radial direction relative to the tool head, and
   wherein the at least one adjustment device includes a motor.

8. The skiving tool of claim 7 wherein the motor is or includes a piezoelectric actuator.

\* \* \* \* \*